April 21, 1942.  E. MARTIN  2,280,714
FEATHERING PROPELLER CONTROL
Filed Jan. 13, 1938   6 Sheets-Sheet 1

INVENTOR.
Erle Martin
BY Harris G. Luther
ATTORNEY

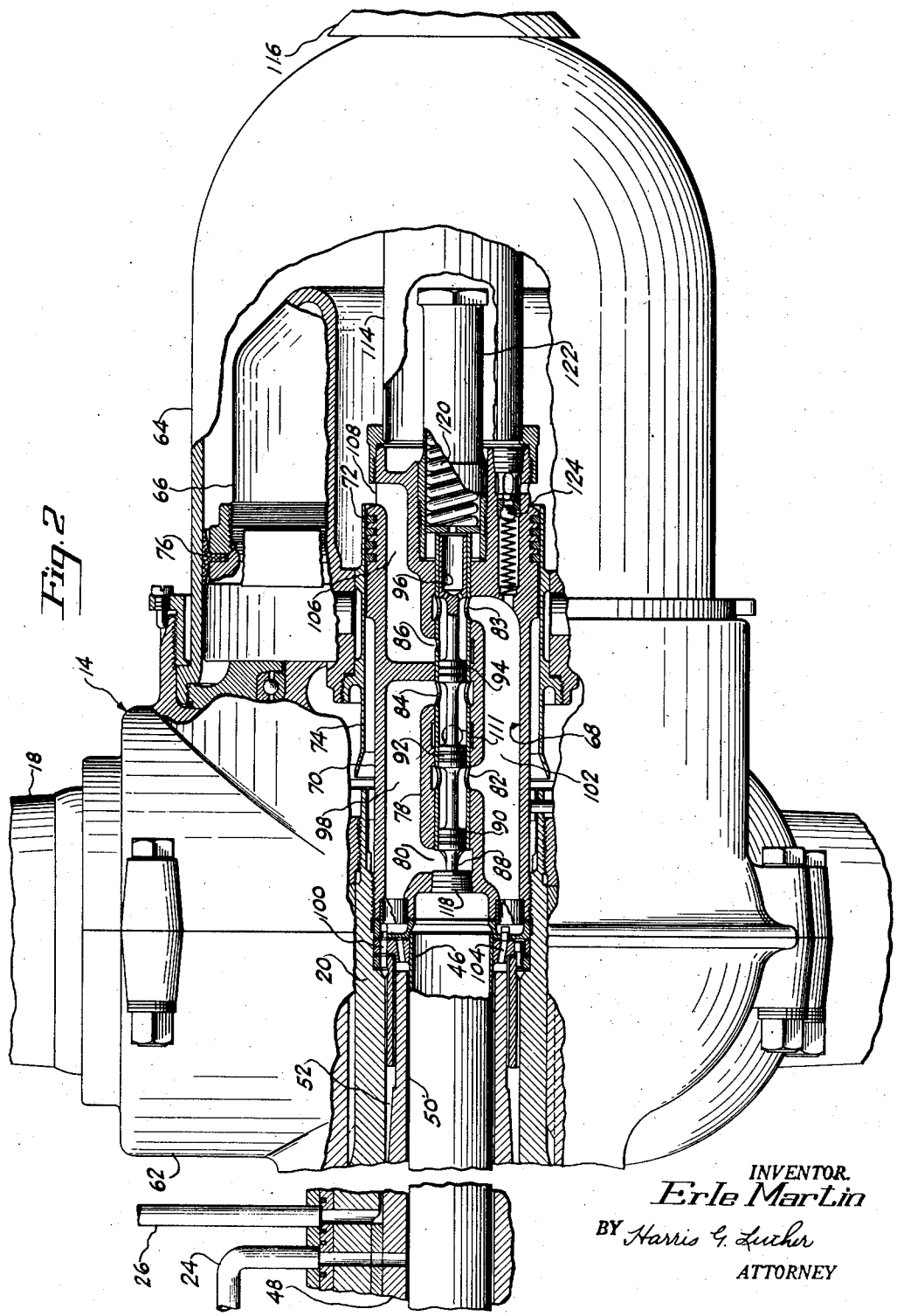

April 21, 1942.  E. MARTIN  2,280,714
FEATHERING PROPELLER CONTROL
Filed Jan. 13, 1938   6 Sheets-Sheet 3
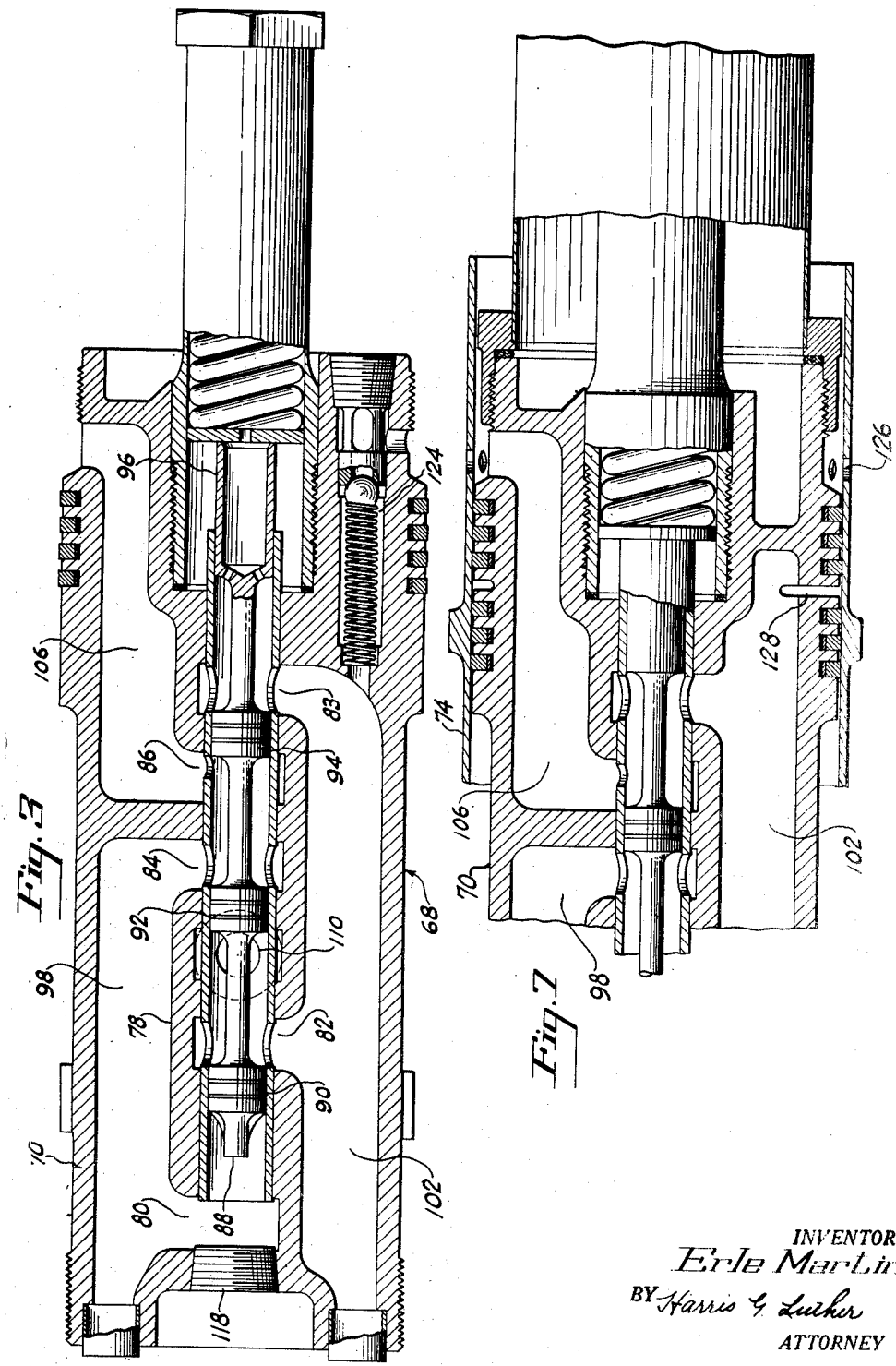
INVENTOR.
Erle Martin
BY Harris G. Luther
ATTORNEY April 21, 1942.  E. MARTIN  2,280,714
FEATHERING PROPELLER CONTROL
Filed Jan. 13, 1938   6 Sheets-Sheet 4
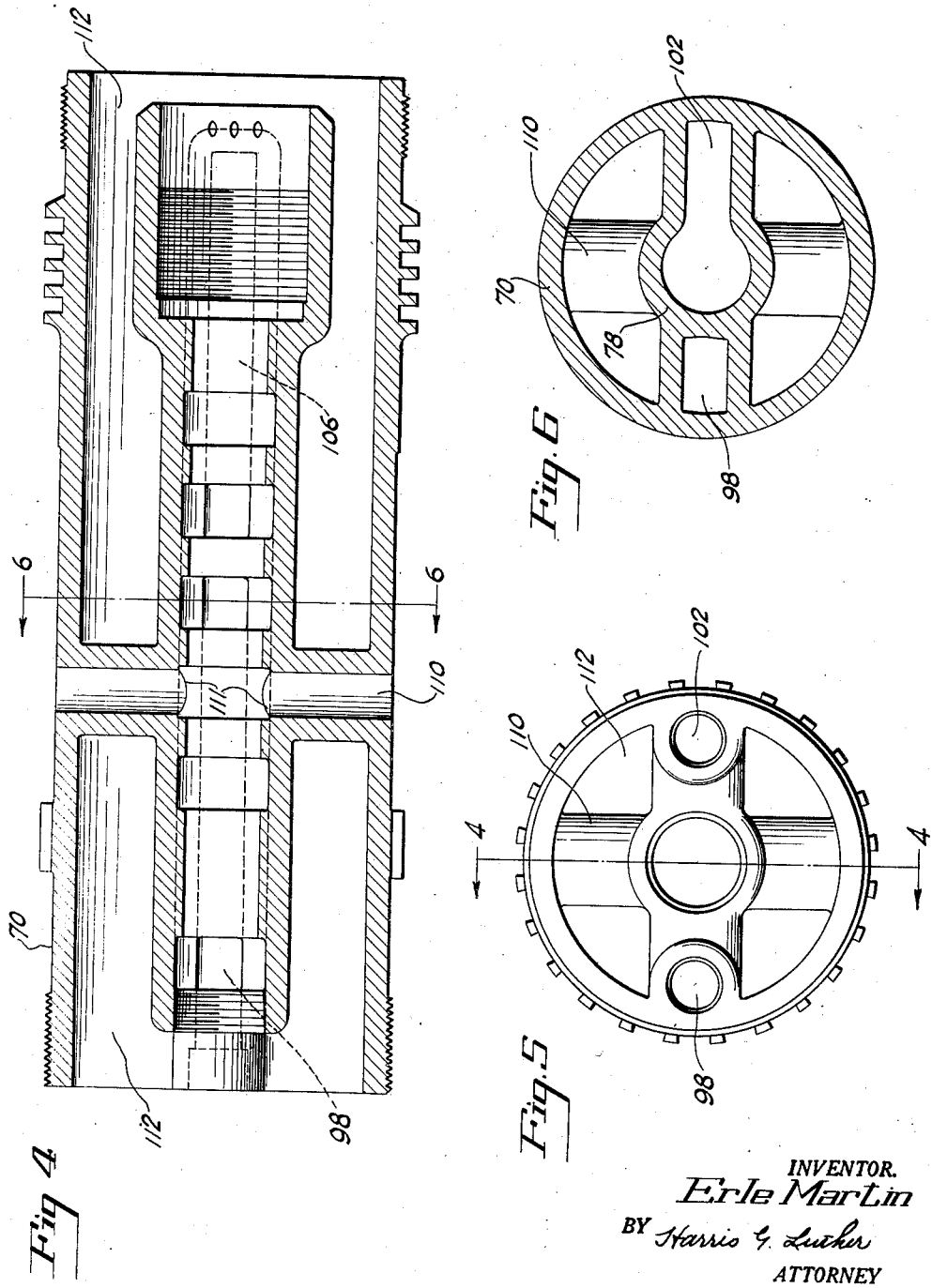
INVENTOR.
*Erle Martin*
BY *Harris G. Luther*
ATTORNEY

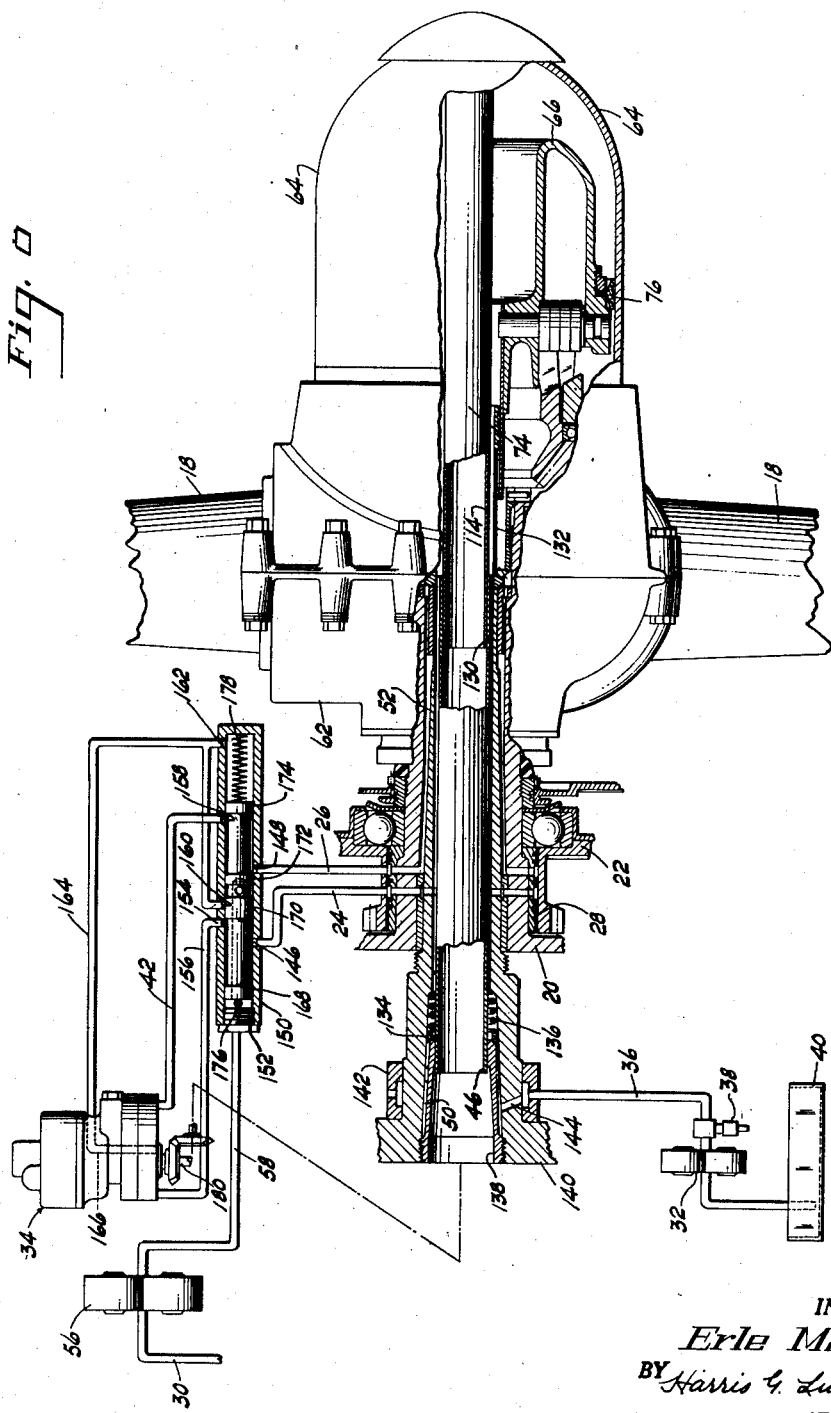

April 21, 1942.  E. MARTIN  2,280,714
FEATHERING PROPELLER CONTROL
Filed Jan. 13, 1938  6 Sheets-Sheet 6
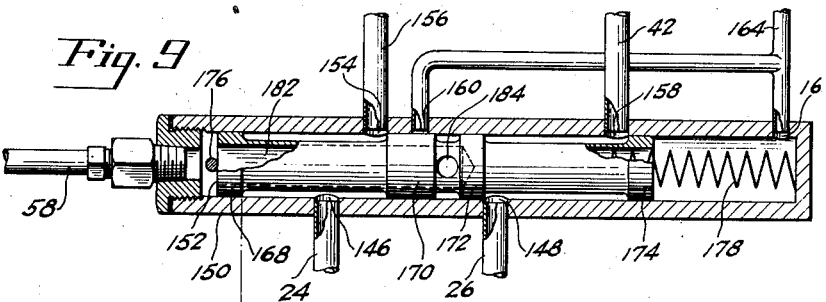
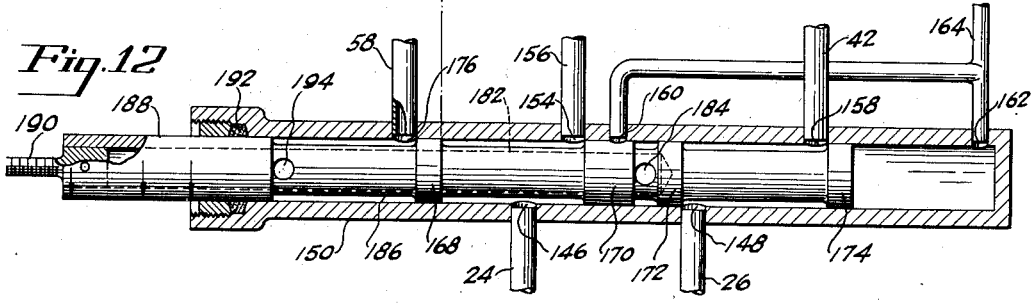
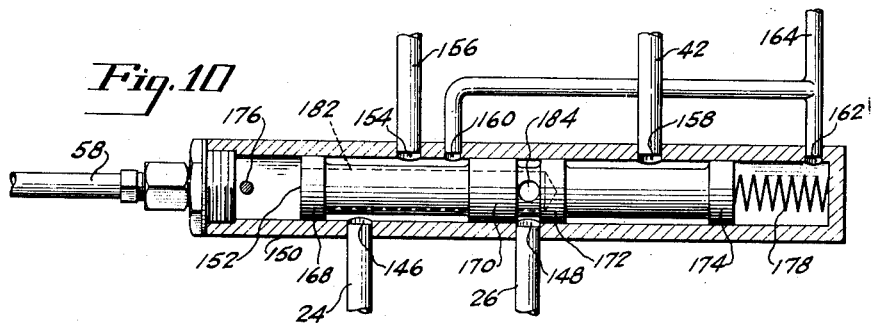
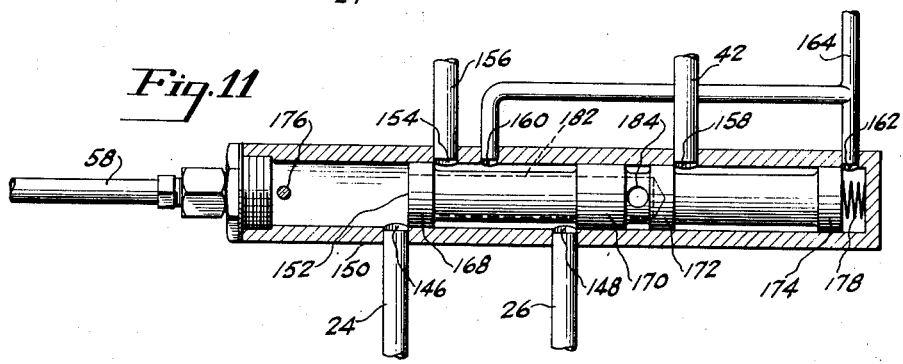
INVENTOR.
Erle Martin
BY Harris G. Luther
ATTORNEY Patented Apr. 21, 1942

2,280,714

UNITED STATES PATENT OFFICE 2,280,714

FEATHERING PROPELLER CONTROL

Erle Martin, West Hartford, Conn., assignor to United Aircraft Corporation, East Hartford, Conn., a corporation of Delaware Application January 13, 1938, Serial No. 184,792

15 Claims. (Cl. 170—163)

This invention relates to improvements in controllable pitch aeronautical propellers and has for an object the provision of an improved controllable pitch propeller in which the propeller blades may be turned from the normally operative range of pitch angles to a feathered condition and may be returned to normal operation by manually controllable hydraulic means.

A further object resides in the provision in a controllable pitch propeller of the character described of resilient means for assisting the centrifugal forces acting on the propeller blades to turn the blades toward their low-pitch position.

A still further object resides in the provision of a controllable pitch propeller of the character indicated in which hydraulic pressure tending to rotate the blades is at all times opposed by a resilient force such as the force of hydraulic fluid under a different pressure.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the invention together with various modified arrangements of certain portions of the general combination. The drawings, however, are for the purpose of illustration only and are not to be taken as limiting the scope of the invention as set forth in the appended claims.

In the drawings,

Fig. 2 is a side elevational view of a propeller hub constructed according to the invention certain portions being broken away and shown in sections to more clearly illustrate the construction thereof.

Fig. 3 is a sectional view of a valve and valve housing disposed in the propeller hub, illustrated in Fig. 2.

Fig. 4 is a sectional view of the valve housing illustrated in Fig. 3 taken on a plane disposed at 90 degrees of the plane of the section shown in Fig. 3.

Fig. 5 is an end elevational view of the valve housing illustrated in Fig. 4.

Fig. 6 is a cross-sectional view taken on the line 6—6 of Fig. 4.

Fig. 7 is a sectional view similar to Fig. 3 showing a somewhat modified form of valve housing.

Fig. 8 is a broken away elevational view similar to Fig. 2 showing a modified form of propeller hub, and a somewhat schematic illustration of a pressure operated valve and check valve arrangement.

Fig. 9 is a view on a somewhat enlarged scale of the pressure operated valve shown in Fig. 8.

Fig. 10 is a view similar to Fig. 9 showing the pressure operated valve when subjected to a feathering pressure.

Fig. 11 is a view similar to Fig. 8 showing the pressure operated valve when subjected to an unfeathering pressure, and Fig. 12 shows the valve of Figs. 9, 10 and 11 arranged for direct manual control.

Figure 1:
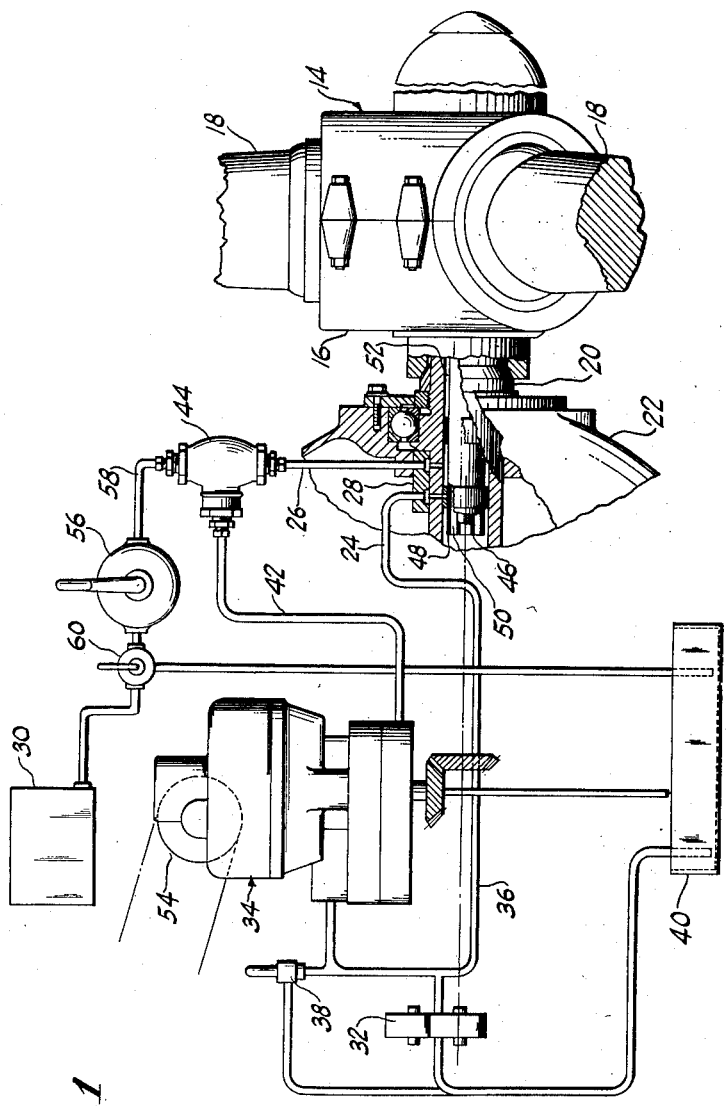
Fig. 1 is a schematic view showing an improved controllable pitch propeller constructed in accordance with the invention associated with pitch controlling and pitch changing means as will be more particularly pointed out hereinafter.

Referring to the drawings in detail, the numeral 14 generally indicates an improved controllable pitch propeller constructed according to the invention and having a hub 16 on which a plurality of blades, as indicated at 18, are rotatably mounted for pitch changing movements.

The propeller 14 is rigidly mounted upon the projecting end of the hollow drive shaft 20 of an engine 22 and the pitch controlling and pitch changing fluid is supplied to the propeller hub through the conduits 24 and 26, the collector ring 28 and the hollow interior of the shaft 20.

In the arrangement illustrated in Fig. 1 the engine lubricating oil is used as the hydraulic fluid which acts to change the propeller pitch although hydraulic fluid may be obtained from other sources, as indicated by way of example at 30, for certain purposes. When the engine lubricating oil is used, the oil supply from the engine oil pump 32 is divided so that some of the oil flows to the speed responsive governor, generally indicated at 34, and another part flows into the engine lubricating system schematically indicated at 36 to lubricate the engine, excess oil from the pressure pump 32 being by-passed through the pressure relief valve 38 and returned to the pump intake or to the sump 40.

The governor 34 may be provided with a booster pump, as is particularly illustrated in application Serial No. 8908, filed March 1, 1935, by Woodward, for Automatic governor control for controllable pitch propellers, so that the oil leaves the governor at a pressure higher than the pressure of the pump 32 as regulated by the pressure relief valve 38. From the governor 34 the oil may flow through a suitable conduit 42 and a check valve 44, which may be of the form particularly illustrated in application Serial No.

147,972, filed June 12, 1937, by Erle Martin, et al., for Feathering propellers, and from the check valve to the conduit 26. The engine lubricating system 36 is connected with the conduit 24 so that two separate oil lines from respectively different pressure sources are led to the collector ring 28.

The interior of the hollow drive shaft 20 may be provided with a substantially concentric breather tube 46 and the space between the breather tube and the hollow interior of the shaft may be substantially equally divided by the concentric annular member 48. This arrangement provides two annular conduits 50 and 52 leading from the conduits 24 and 26 respectively to the interior of the propeller hub.

The speed responsive governor 34 controls the propeller pitch throughout the normally operative range of pitch adjustment to maintain the rotational speed of the engine and propeller substantially constant. The governor is preferably provided with a manually actuatable adjusting device 54 so that the value of the constant rotational speed may be varied as desired. The propeller 14 is also capable of attaining a feathered pitch condition in which the blades are rotated beyond the normally operative pitch range to a position in which they are substantially parallel to the direction of the air stream flowing past the propeller. The blades may be moved to this extremely high pitch or feathered position by imposing on the hydraulic pitch changing means a fluid pressure higher than the pressure at the outlet of the governor 34, and may be returned from their feathered positions to the normally operative range of pitch adjustment by imposing a still higher pressure on the hydraulic pitch controlling means. The feathering and unfeathering pressures may be obtained by means of a suitable fluid pump, as schematically shown at 56, and which may be either manually or power actuated. This high pressure pump has its outlet connected by means of conduit 58 with one side of the check valve 44 which is so arranged that when fluid under high pressure is applied to the valve, the conduit 42 is blocked off and the conduit 58 connected directly with the conduit 26, as is particularly pointed out in application Serial No. 147,972, referred to above. The pump 56 has its inlet connected with some fluid reservoir such as the sump 40 or the tank or supply line 30 and may be alternatively connected with either the sump or the tank by means of a suitable two-way valve, as indicated at 60.

Reference may now be had to Figs. 2 to 6 inclusive for detailed description of the improved hydraulic pitch controlling mechanism.

Referring particularly to Fig. 2 the blades 18 are rotatably mounted in a hub barrel member 62 which carries at one side thereof a cylinder 64 enclosing a reciprocal piston 66 operatively connected with the blades 18 through suitable cams and gear elements, such as are particularly illustrated and described in application Serial No. 94,202, filed August 4, 1936, by Frank W. Caldwell et al., for Multi-position controllable pitch propellers. With the operative connection referred to, the blades 18 are caused to rotate in the barrel member 62 upon reciprocation of the piston 66 in the cylinder 64.

The piston 66 is centrally apertured and slidably receives a concentric, relatively fixed, valve casing, generally indicated at 68, and particularly illustrated in Figs. 3, 4, 5 and 6. This valve casing 68 has a substantially cylindrical outer shell 70 screw-threaded at one end into the end of the drive shaft 20 and provided at its opposite end with a plurality of external annular rings 72 which cooperate with the interior of a cylindrical member 74 secured to the piston 66 to provide a fluid seal between the two ends of the piston, the seal being completed by the gasket 76 which is carried by the piston and cooperates with the interior surface of the cylinder 64. Within the cylindrical casing 70 there is an integral valve cylinder 78 provided with ports, as indicated at 80, 82, 83, 84 and 86, and which slidably receives the movable valve stem 88 provided with the spaced valve gates 90, 92 and 94 and the cylindrical end portion 96. Also within the valve casing 58 there are various fluid channels for directing fluid from different pressure sources to opposite sides of the piston 66. The channel 98 is connected at one end through the wall 100 with the annular channel 52 connected with the fluid conduit 26 and is also connected with the valve ports 80 and 84. The fluid channel 102 is connected at one end through the well 104 with the annular channel 50 leading to the conduit 24 and is also connected with the valve ports 82 and 83. A third channel 106 is connected with the valve port 86 and leads to the exterior of the valve casing 68 through a port 108 at the forward end of the valve shell 70 to the space ahead of the piston 66, while a fourth channel 110 leads through the ports 111 from the interior of the valve cylinder 78 between the valve gates 92 and 94 to the exterior of the valve casing 68 at the rear of the piston 66. The arrangement of these various channels is particularly shown in Figs. 3, 4, 5 and 6 in which it is clearly shown that each channel is separately enclosed and that continuous spaces, as indicated at 112, are provided through the valve casing, connected with the interior of the breather tube 50 and leading to the extension tube 114 which vents through the front end of the cylinder 64 beneath the cap 116.

The movable valve stem 88 is strongly urged toward its rearmost position, in which its rearward end is in contact with the plug 118, by a relatively stiff spring 120 secured in the forward end of the valve casing 68 by means of a screwthreaded spring enclosing cylinder 122.

The operation of the device so far described is substantially as follows. Engine lubricating oil at engine oil pressure is supplied through the conduit 24, the annular channel 50, the well 104 and the channel 102 to the valve ports 82 and 83. The port 82 being blocked by the valve gates 90 and 92, the engine lubricating oil flows through the ports 83 and 86, with the valve stem in the position shown in Fig. 2, and from the port 86 through the channel 106 and port 108 to the space at the front of the piston 66 maintaining this space constantly filled with oil at engine lubricating oil pressure. This oil in the space at the front of the piston exerts a continuous rearwardly directed force on the piston which is in the form of a resilient force, added to the blade twisting force created by the centrifugal action of the propeller blades, tending at all times to rotate the blades toward their low-pitch condition. When the piston 66 is forced forwardly by the application of hydraulic fluid at a higher pressure to the rear face thereof, the oil in the forward space drains back through the channels enumerated above and through the engine lubricating system and the pressure relief valve 38.

Oil from the governor 34 flows through the conduit 26, the annular channel 52, the well 100 and channel 98 to the valve ports 80 and 84. The port 80 being blocked by the valve gate 90, when the valve is in the position illustrated in Fig. 2, the oil flows through the port 84 to the channel 110 and through this channel to the space at the rear of the piston 66. As the governor oil is at a higher pressure than the engine lubricating oil, when a supply of governor oil is admitted to the space at the rear of the piston 66, the piston is forced forwardly against the pressure of the engine lubricating oil in the forward space and the centrifugal action of the blades to increase the pitch of the propeller. The supply of governor oil is controlled by a governor actuated valve such as is particularly illustrated and described in the Woodward patent Serial No. 8908, referred to above, so that the space at the rear of the piston is intermittently connected with the governor pump outlet or with drain, and the piston 66 moves accordingly to change the pitch of the propeller blades in response to the governor action.

When it is desired to bring the propeller blades to their feathered position, a feathering pressure is built up by the pump 56 and applied to the conduit 26 through the check valve 44 in the manner indicated above. This oil at the feathering pressure is admitted to the space at the rear of the piston 66 through the channels enumerated above in connection with the admission of the governor oil and exerts a constant pressure on the rear of the piston greater than the combined effects of the engine lubricating oil pressure in the space at the front of the piston and the twisting action on the blades induced by centrifugal force, to move the blades to their limiting high pitch or feathered condition. The high pitch position of the blades is normally limited by a change in the direction of the piston-operated cams, as particularly described in application Serial No. 94,202 referred to above, and by the action of the governor which, in response to a slowing down of the propeller at high pitch angles, tends to connect the space at the rear of the piston with drain when the maximum desirable pitch angle has been reached. The oil supply at feathering pressure, however, is effective to disable the governor by changing the check valve 44 and also exerts sufficient pressure to overcome the additional resistance incident to the change in cam angle and effectively forces the blades to rotate to their condition of maximum pitch. The feathering pressure, however, is insufficient to compress the spring 120 to materially change the position of the valve stem 88 from the position illustrated in Fig. 2 so that the oil at feathering pressure will flow, in the manner described above in connection with the oil from the governor outlet, to the space at the rear of the piston.

When it is desired to unfeather the propeller or restore it from a feathered condition to normal operation, it is necessary only to increase the pressure exerted by the pump 56. This increased pressure of the hydraulic fluid flowing through the check valve and the conduit 26 to the valve channel 98 acts on the rear surface of the valve gate 99 and forces the valve member 88 forwardly against the pressure of the spring 120 to a position, particularly illustrated in Fig. 3, in which the port 84 is connected with the port 86 through the valve stem reduction between the gates 92 and 94, thereby directing the high pressure fluid from the channel 98 through the channel 106 to the space at the forward end of the piston 66 to force the piston rearwardly and decrease the pitch of the propeller blades. Simultaneously the channel 110 is connected with the port 82 and the port 83 is closed by the gate 94, thereby permitting the fluid from the space at the rear of the piston to flow into the valve channel 102 and from there through the annular channel 50 to vent through the engine lubricating system and the pressure relief valve 38. A safety pressure relief valve 124 is disposed between the space at the forward end of the piston and the valve channel 102 to relieve the fluid pressure in this space in case the high pressure pump is actuated after the piston has been moved back to the extreme low pitch condition, to avoid the possibility of endangering the hub structure by subjecting it to excessively high pressures. After the propeller has been brought out of the feathered condition in the manner indicated above, in order to restore it to normal operation under governor control, it is only necessary to discontinue the high pressure exerted by the pump 56 and permit the valve member 88 to return to its normal position as illustrated in Fig. 2.

In the modified form of the device illustrated in Fig. 7 the pressure relief safety valve 124 is omitted and the cylindrical member 74 and valve shell 70 are provided with cooperating apertures 126 and 128 respectively which register when the piston has been moved back to its limiting rearward position to provide a passage from the fluid space at the front end of the piston to the channel 102 to relieve the fluid pressure in the space at the forward end of the piston.

In some installations it may be desirable to mount the valve 68 in a relatively stationary position outside of the propeller. A manner in which this may be accomplished without losing or minimizing any of the functions or advantages of the arrangement is clearly illustrated in Figs. 8, 9 and 10.

In the arrangement shown in Fig. 8 the valve and valve casing 68 is omitted from the propeller hub and extension tube 114 is extended inwardly to a telescopic connection with the breather tube 46, as indicated at 130. Instead of the valve casing 70 a cylindrical member 132 is secured to the end of the drive shaft at one end and is provided at its other end with a fluid seal cooperating with the piston carried cylindrical member 74. The member 132 separates the annular channels 50 and 52 at the end of the drive shaft and connects the channel 50 with the space at the front end of the piston 66 and the channel 52 with the space at the rear end of the piston 66. With this arrangement the manner of the application of the hydraulic fluid under pressure to the opposite ends of the piston will depend upon the manner of connecting the various sources of fluid under pressure to the conduits 24 and 26 which are connected respectively with the annular channels 50 and 52.

In the form of the invention illustrated in Figs. 8, 9 and 10 the annular channel 50 is provided with a check valve in the form of an annular member 134 which surrounds the breather tube 46 near its rearward end and is urged by a spring 136 into sealing relation with the end of the plug 138 secured in the interior of the crankshaft 140. Engine lubricating oil is supplied from the lubricating pump 32 through the engine lubricating system to the annular bushing 142 and from the interior of the bushing through the oil holes 144 in the crankshaft. With this arrangement lubricating oil may flow from the engine lubricating system to the propeller through the annular channel 50 but a return of oil through this channel from the propeller to the engine lubricating system is blocked by the check valve 134.

The conduit 24 connects with the annular channel 50 ahead of the check valve 134 through the oil collector ring 28, and the conduit 26 connects through the same or a similar collector ring with the annular channel 52 leading to the space at the rear of the piston 66. The conduits 24 and 26 are connected with respective ports 146 and 148 in a cylindrical valve casing 150 within which is disposed the slidable valve plunger 152. The valve casing is provided with additional ports of which the port 154 connects with the governor inlet 156, the port 158 connects with the governor outlet 42 and the ports 160 and 162 connect with the drain channel 164 which may conveniently be connected with the governor bowl drain 166 and which is arranged to return oil passing therethrough to the sump 40 or to some other suitable oil reservoir. The plunger 152 is provided with spaced valve gates 168, 170, 172, and 174 which control the various ports enumerated above in a manner to be presently described. The valve plunger is normally urged to its limiting position against the stop pin 176 by a suitable spring 178 disposed between the valve plunger and the closed end of the cylindrical valve casing 150. The outlet 58 of the high pressure pump 56 is connected into the end of the valve casing 150 opposite the end receiving the spring 178 so that the oil at high pressure flowing through the conduit 58 may act on the plunger 152 to move the same to various positions to control the valve ports for feathering and unfeathering the propeller.

When the elements are in the relation as illustrated in Figs. 8 and 9, the high pressure pump 56 is not being utilized, and the valve plunger 152 is in position for governing control of the propeller. With this arrangement of parts the oil flows from the engine lubricating pump 32 and lubricating system 36 to the annular channel 50 within the crankshaft 140. Oil in the channel 50 flows past the check valve 134 and the flow divides at the point of connection of the conduit 24 to the channel 50, some of the oil continuing through the annular channel to the space at the front end of the piston 66 while a portion is diverted through the conduit 24 to the interior of the valve casing 150 where it flows around the reduced plunger portion between the gates 168 and 170 and through the port 154 and conduit 156 to the inlet of the governor 34. From the governor the oil, at a pressure higher than that imposed by the lubricating pump 32, flows through the conduit 42, the port 158 and the reduced portion of the valve plunger between the valve gates 172 and 174 to the conduit 26 from which it flows into the annular channel 52 and to the space at the rear of the piston 66.

The governor is provided with a valve which is operative to connect the outlet conduit 42 with the outlet of the governor pump or with the drain 180. When the outlet conduit 42 is connected with the governor pump, the oil is pumped from the space in front of the piston 56 through the annular channel 50, the conduit 24 and the governor inlet conduit 156 to the space at the rear of the piston through the governor outlet conduit 42, the conduit 26 and the annular channel 52 thereby forcing the piston 56 forwardly in the cylinder 64 to increase the pitch angle of the propeller blades 18. Any necessary quantity of make-up oil for complete governor operation is supplied to the system through the check valve 134. When the governor valve is in position to connect the governor outlet conduit 42 with the drain 180, the oil at the rear of the piston flows through the annular channel 52, the conduit 26, the valve casing 150 and the conduit 42 to the drain 180 while the governor inlet channel 156 on the outlet side of the governor pump is blocked by the valve and draws no oil from the engine lubricating system. At the same time oil from the engine lubricating pump 32 flows past the check valve 34 and through the annular channel 50 to the space at the forward end of the piston 56 to exert there a resilient pressure which assists the centrifugal twisting moment on the propeller blades to move the blades towards a lower pitch position.

In order to bring the propeller blades 18 to a feathered condition the pump 56 is operated to build up a feathering pressure higher than the governor pump pressure, in the outlet conduit 58. This pressure acts against the adjacent end of the valve plunger 152 and moves the plunger against the resistance of the spring 178 to the position illustrated in Fig. 10. In this position of the valve plunger the relatively short reduced portion between the valve gates 170 and 172 is brought into alignment with the port 148 connected with the conduit 26. The oil from the conduit 58 then flows through the longitudinal bore 182 in the valve plunger to the transverse apertures 184 from which it flows into the annular reduced portion between the valve gates 170 and 172 and through the port 148 into the conduit 26. From the conduit 26 the oil flows in the manner described above to the space at the rear of the piston to force the piston ahead and rotate the propeller blades to their maximum high pitch or feathered position. At the same time the oil in the space at the front of the piston flows through the annular channel 50 and conduit 24 to the interior of the valve casing 150 through the port 146, and then flows around the reduced portion of the valve plunger between the gates 168 and 170, and through the port 160 to the drain conduit 164 from which it is returned to the engine oil sump or oil reservoir. With the valve plunger 152 in the position illustrated in Fig. 10, the governor outlet 42 is blocked by the valve gates 172 and 174 so that the governor is disabled and the circulation of oil through the governor from the inlet 156 to the outlet 42 is discontinued.

When it is desired to unfeather the propeller, that is, to return the propeller from a feathered condition to normal operation, the output of the pump 56 is increased to the unfeathering pressure which is greater than the feathering pressure, the governing pressure and the pressure exerted by the lubricating pump 32. This increased pressure, acting on the end of the valve plunger 152 opposite the spring 178, brings the plunger to the position illustrated in Fig. 11. In the indicated position, the valve plunger 152 is moved to the right, as viewed in Fig. 10, until the valve gate 168 is at the right hand side of the port 146 thereby connecting the conduit 58 directly with the conduit 24 to lead the high pressure oil to the space at the front end of the piston 66. The conduit 26 is connected through the reduced plunger portion between the valve gates 168 and 170 with the drain conduit 164 to connect the oil in the space at the rear of the piston to drain, thereby allowing the piston to move rearwardly and rotate the propeller blades from their feathered condition to a lower pitch. The governor outlet 42 remains blocked by the valve gates 172 and 174 so that the circulation of oil through the governor remains interrupted. At the same time the check valve 134 closes to prevent the high pressure oil in the conduit 24 from flowing back to the engine lubricating system. During both the feathering and the unfeathering operations the space between the end of the valve plunger carrying the valve gate 174 and the closed end of the valve cylinder 150 is connected through the port 162 with the drain 164 so that the valve will be free to move under the influence of the feathering and unfeathering pressures applied to the conduit 58.

In some installations it may be found desirable to actuate the pitch controlling valve manually instead of by the application of different pressures thereto as described above. A valve particularly arranged for manual operation is illustrated in Fig. 12. This arrangement may advantageously employ substantially the same valve as is illustrated in Figs. 8, 9, 10 and 11, simply adding thereto a portion to serve as a connection to the manual operating means and to balance the pressure admitted through the conduit 58. In this arrangement the valve plunger is extended to the left beyond the valve gate 168 to provide a reduced portion 186 terminated by an elongated cylindrical portion 188 within the end of which is secured a fitting 190 for connection to the manual control means, not illustrated. The valve casing 150 is also elongated and provided in its end with a packing gland 192 surrounding the cylindrical portion 188. Within the reduced portion 186 there is provided an aperture 194 which communicates with the hollow interior 182 of the valve plunger and therethrough with the aperture 184, located between the valve gates 170 and 172. The high pressure pump outlet 58 is so disposed along the length of the valve casing that its port 196 is disposed at all times between the valve gate 168 and the cylindrical end portion 188.

As the various positions of the plunger of the valve shown in Fig. 12 for governor control, feathering and unfeathering are exactly the same as the corresponding positions of the valve illustrated in Figs. 8, 9, 10 and 11, it is believed that reference to the description of these figures is sufficient for the purpose of disclosing the various operative positions of the valve illustrated in Fig. 12. When the valve is actuated manually, the propeller may be feathered and unfeathered with the same high pressure, the application of this pressure to the opposite sides of the piston being controlled by manual actuation of the valve, so that in this arrangement only three degrees or stages of fluid pressure are necessary whereas with the pressure actuated type of valve four such degrees or stages are utilized.

While there has been illustrated a suitable mechanical embodiment of what is now considered to be the preferred form of the invention and two somewhat modified forms thereof, it is to be understood that the invention is not limited to the particular embodiment so illustrated and described but that such changes in the size, shape and arrangement of parts may be resorted to as come within the scope of the subjoined claims.

Having now described the invention so that others skilled in the art may clearly understand the same what is desired to secure by Letters Patent is as follows:

1. In a controllable pitch propeller and control mechanism therefor in combination, a plurality of propeller blades rotatably supported for pitch changing movement, an expansible chamber device having a movable element operably connected with said blades for effecting pitch changes, a source of fluid under a substantially constant pressure, a source of fluid under an increased pressure higher than said substantially constant pressure and a source of fluid under a high pressure higher than said increased pressure, means for continuously supplying said fluid under constant pressure to one side of said movable element to urge said blades to one pitch position, means for directing fluid under said increased pressure to the opposite side of said movable element to move said element a predetermined distance and place said blades in another pitch position, and means for directing fluid under said high pressure to said opposite side of said movable element to move the element a further distance and place the blades in still another pitch position.

2. A device, as set forth in claim 1, including means for reversing the application of said constant pressure fluid to the movable element, and means for directing fluid under a pressure as least as high as said high pressure to said one side of said movable element to return the blades toward said one pitch position.

3. In a controllable pitch propeller in combination, a hub, a plurality of blades carried by said hub for pitch changing movements, a hydraulic mechanism including a movable element operatively connected with said blades to change the pitch thereof, said element operative in response to a preponderating pressure on one side thereof to urge said blades in a pitch reducing direction and in response to a preponderating pressure on the opposite side thereof to move said blades in a pitch increasing direction, means for applying a first stage of hydraulic pressure to one side of said movable element, a second stage of hydraulic pressure higher than said first stage, and means for varying the application of said second stage hydraulic pressure to said movable element to change the preponderance of hydraulic pressure from one side of said movable element to the other, a third stage of hydraulic pressure higher than said second stage, and means for substituting said third stage hydraulic pressure for said second stage pressure and continuously applying it to one side of said movable element to create a preponderant pressure on said side thereof.

4. In a controllable pitch propeller in combination, a hub, a plurality of blades carried by said hub for pitch changing movements, a hydraulic mechanism including a movable element operatively connected with said blades to change the pitch thereof, said element operative in response to a preponderating pressure on one side thereof to urge said blades in a pitch reducing direction and in response to a preponderating pressure on the opposite side thereof to move said blades in a pitch increasing direction, means for applying a first stage of hydraulic pressure to one side of said movable element, a second stage of hydraulic pressure higher than said first stage, and means for varying the application of said second stage hydraulic pressure to said movable element to change the preponderance of hydraulic pressure from one side of said movable element to the other, a third stage of hydraulic pressure higher than said second stage, means for substituting said third stage hydraulic pressure for said second stage pressure and continuously applying it to one side of said movable element to create a preponderant pressure on said side thereof, and means for changing said preponderant pressure from one side of said movable element to the other.

5. Control means for a controllable pitch propeller including, a hub, a plurality of blades carried by said hub for pitch changing movements, and a hydraulic mechanism including a movable element operatively connected with said blades, comprising a first source of hydraulic pressure, a second source of hydraulic pressure higher than the pressure of said first source, and a third source of hydraulic pressure higher than said second source, means for connecting one side of said movable element with said first source and the other side with said second source, means for varying the pressure exerted by said second source on said movable element to render the pressure of said first source effective to assist the twisting moment, exerted on the blades by centrifugal force to move the blades in a pitch reducing direction or to render the pressure of said second source effective to move the blades in a pitch increasing direction, and means for substituting a continuously open connection between said third source and said movable element for the connection between said second source and said movable element.

6. In a controllable pitch propeller and control mechanism therefor, in combination, a hub, a plurality of blades carried by said hub for pitch changing movements, a hydraulic mechanism including a movable element operatively connected with said blades to change the pitch thereof operative in response to a preponderating pressure on one side thereof to urge said blades in a pitch reducing direction and in response to a preponderating pressure on the opposite side thereof to move said blades in a pitch increasing direction, a first stage of hydraulic pressure, means for continuously supplying said first stage pressure to said hydraulic mechanism, means for directing said first stage pressure to one side of said movable element, a second stage of hydraulic pressure higher than said first stage, means for variably applying pressure from said second stage to the opposite side of said movable element to change the preponderance of hydraulic pressure from one side of said movable element to the other, a third stage of hydraulic pressure higher than said second stage, a fourth stage of hydraulic pressure higher than said third stage, means for substituting said third stage pressure for said second stage pressure and continuously applying it to said opposite side of said movable element and means for simultaneously substituting said first stage pressure for said third stage pressure and directing said fourth stage pressure to said one side of said movable element.

7. The construction as set forth in claim 6 wherein said last named means comprises a pressure actuated valve actuatable by said fourth stage of hydraulic pressure.

8. In a controllable pitch propeller and control means therefor, in combination, a hub, a plurality of blades carried by said hub for pitch changing movements, an hydraulic mechanism including a movable element operatively connected with said blades to change the pitch thereof, said element operative in response to a preponderating pressure on one side thereof to urge said blades in a pitch reducing direction, and in response to a preponderating pressure on the opposite side thereof to move said blades in a pitch increasing direction, a first stage of hydraulic pressure, means directing said first stage pressure to said one side of said movable element, a second stage of hydraulic pressure higher than said first stage, means for variably connecting said second stage pressure with said opposite side of said movable element to create a preponderance of hydraulic pressure changeable from one side of said movable element to the other to urge said blades in a pitch reducing direction or to move said blades in a pitch increasing direction to a predetermined extent, a third stage of hydraulic pressure higher than said second stage, and means including a valve disposed in said propeller hub for substituting said third stage pressure for said second stage pressure and continuously applying said third stage pressure to said opposite side of said movable element to move said blades in a pitch increasing direction beyond said predetermined extent.

9. In a controllable pitch propeller and control means therefor, in combination, a hub, a plurality of blades carried by said hub for pitch changing movements, an hydraulic mechanism including a movable element operatively connected with said blades to change the pitch thereof, said element operative in response to a preponderating pressure on one side thereof to urge said blades in a pitch reducing direction, and in response to a preponderating pressure on the opposite side thereof to move said blades in a pitch increasing direction, a first stage of hydraulic pressure, means directing said first stage pressure to said one side of said movable element, a second stage of hydraulic pressure higher than said first stage, means for variably connecting said second stage pressure with said opposite side of said movable element to create a preponderance of hydraulic pressure changeable from one side of said movable element to the other to urge said blades in a pitch reducing direction or to move said blades in a pitch increasing direction to a predetermined extent, a third stage of hydraulic pressure higher than said second stage, and a manually actuatable valve operative in one position to interrupt the application of said second stage pressure to said opposite side of said movable element and apply said third stage pressure continuously to said opposite side of said movable element and in another position to maintain the interruption of the application of said second stage hydraulic pressure and to apply said third stage of hydraulic pressure to said one side of said movable element at the same time venting said opposite side of said movable element.

10. In a controllable pitch propeller and control mechanism therefor in combination, a hub, a plurality of blades carried by said hub for pitch changing movements, a hydraulic mechanism including a movable element operatively connected with said blades to change the pitch thereof operative in response to a preponderating pressure on one side thereof to urge said blades in a pitch reducing direction and in response to a preponderating pressure on the opposite side thereof to move said blades in a pitch increasing direction, a first stage of hydraulic pressure, means for continuously supplying said first stage pressure to said hydraulic mechanism, means for directing said first stage pressure to one side of said movable element, a second stage of hydraulic pressure higher than said first stage, means for variably applying pressure from said second stage to the opposite side of said movable element to change the preponderance of hydraulic pressure from one side of said movable element to the other, a third stage of hydraulic pressure higher than said second stage, a fourth stage of hydraulic pressure higher than said third stage, and a pressure actuated valve actuatable by said third stage pressure to substitute said third stage pressure for said second stage pressure and actuatable by said fourth stage pressure to substitute said first stage pressure for said third stage pressure and direct said fourth stage pressure to said one side of said movable element.

11. In a controllable pitch propeller and control means, in combination, a hub, a plurality of blades carried by said hub for pitch changing movement, a hydraulic mechanism including a movable element operatively connected with said blades to change the pitch thereof operative in response to a predominating pressure in one side thereof to urge said blades in a pitch reducing direction and in response to a predominating pressure on the opposite side thereof to move said blades in a pitch increasing direction, a pressure lubricating system for a propeller driving engine, means for continuously supplying said engine lubricating pressure to said hydraulic mechanism, means for directing said engine lubricating pressure to said one side of said movable element, a hydraulic governor having an outlet pressure higher than said engine lubricating pressure, means for variably applying said governor outlet pressure to said opposite side of said movable element to create a preponderance of hydraulic pressure on one side or the other of said movable element, a manually controllable device capable of developing a propeller feathering pressure higher than said governor outlet pressure and a propeller unfeathering pressure higher than said propeller feathering pressure and means operative to substitute said feathering pressure for said governor outlet pressure and continuously apply said feathering pressure to said opposite side of said movable element, and a valve operative to substitute said engine lubricating pressure for said feathering pressure and direct said unfeathering pressure to said one side of said movable element.

12. In combination with a controllable-pitch propeller having a hub, a plurality of blades rotatably mounted in said hub for pitch changing movements and biased in one direction by the action of centrifugal force thereon during propeller rotation, and a piston carried by said hub operably connected to said blades to change the pitch thereof, means operatively associated with said piston for controlling the propeller pitch to maintain a substantially constant propeller speed comprising, means for simultaneously supplying hydraulic fluid at two different pressures, the means for supplying fluid at the lower of said pressures comprising a pump and a pressure regulating device for maintaining the pressure from said pump substantially constant, means for continuously applying hydraulic fluid at the lower of said two different pressures to one side of said piston to urge said piston in a pitch decreasing direction, means for simultaneously applying fluid at the higher of said pressures to the other side of said piston in a pitch increasing direction against the action of the blade twisting moment imposed by centrifugal force during propeller rotation and the force exerted by the fluid at said lower pressure on said piston, and speed responsive means for relieving said higher pressure and connecting said other side of the piston with a drain to enable said centrifugally imposed blade twisting moment and the force imposed on said piston by said low pressure fluid to move said blades in a pitch decreasing direction.

13. In a controllable-pitch propeller operative to maintain a substantially constant rotational speed, blades rotatably supported for pitch changing movements, an expansible chamber device carried by said propeller and having a movable element operatively connected with said blades, means comprising a pressure fluid supply means and a pressure regulating device associated therewith maintaining the pressure of the fluid from said supply means at a substantially constant value, for continuously applying said fluid to one side of said movable element during said constant speed operation, means for applying fluid at a higher pressure to the opposite side of said movable element, a speed responsive governor driven at a fixed ratio of the propeller speed, and a governor actuated valve hydraulically interposed between said expansible chamber device and said high pressure fluid applying means for controlling the application of said fluid at said higher pressure to the movable element of said expansible chamber device and alternatively venting the corresponding side of said expansible chamber device to control the direction of movement of said movable element by changing the preponderance of fluid pressure from one side to the other side thereof.

14. In combination with a controllable-pitch propeller having blades rotatably mounted for pitch changing movements and a motor device rotatable with said propeller and having a movable element connected with said blades, a source of hydraulic fluid under pressure, means connecting said pressure fluid source with said motor at one side of said movable element, and pressure regulating means connected with said source and said motor operative to maintain the fluid pressure in said one side thereof substantially constant at a predetermined value, whereby fluid may flow to and from said one side of said motor at said substantially constant predetermined pressure, a source of hydraulic fluid at a pressure higher than said predetermined pressure, means connecting said source of fluid at said higher pressure with said motor at the opposite side of said movable element so that said fluid at said predetermined pressure is effective to urge said movable element in one direction and said fluid at said higher pressure is effective to move said movable element in the opposite direction, and means for interrupting the application of fluid at said higher pressure and venting said opposite side of said movable element while maintaining said substantially constant predetermined pressure on said one side of said movable element to render said element movable in the direction in which it is urged by the fluid at said predetermined pressure and to render the fluid at said predetermined pressure effective to assist in moving said element.

15. In a controllable-pitch propeller operative to maintain a substantially constant rotational speed, blades rotatably supported for pitch changing movements, an expansible chamber device carried by said propeller and having a movable element operatively connected with said blades to change the pitch thereof, a source of fluid under pressure connected with said expansible chamber device at one side of said movable element continuously applying fluid under pressure to said one side of said movable element during said constant speed operation, pressure regulating means connected with said expansible chamber device at said one side of said movable element and with said source of fluid for maintaining the fluid pressure applied to said one side of said movable element substantially constant at a predetermined value, means for applying fluid at a higher pressure to the opposite side of said movable element, and means for controlling the application of said fluid at said higher pressure to said movable element without affecting the application of fluid at said substantially constant pressure thereto.

ERLE MARTIN.